(12) United States Patent
Tai et al.

(10) Patent No.: US 10,732,457 B2
(45) Date of Patent: Aug. 4, 2020

(54) BACKLIGHT MODULE AND DISPLAY DEVICE HAVING TRANSPARENT SUBSTRATE WITH A PLURALITY OF LIGHT SOURCE DISPOSED THEREON

(71) Applicant: HON HAI PRECISION INDUSTRY CO., LTD., New Taipei (TW)

(72) Inventors: Ming-Cheng Tai, New Taipei (TW); Li-Chiao Huang, New Taipei (TW); Chia-Yi Tsai, New Taipei (TW); Yao-Pin Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/260,404

(22) Filed: Jan. 29, 2019

(65) Prior Publication Data

US 2019/0324324 A1   Oct. 24, 2019

Related U.S. Application Data

(60) Provisional application No. 62/660,205, filed on Apr. 19, 2018.

(51) Int. Cl.
    *G02F 1/13357*    (2006.01)
(52) U.S. Cl.
    CPC .. *G02F 1/133605* (2013.01); *G02F 1/133603* (2013.01); *G02F 1/133608* (2013.01); *G02F 1/133611* (2013.01); *G02F 2001/133612* (2013.01); *G02F 2001/133614* (2013.01)

(58) Field of Classification Search
    CPC ......... G02F 1/133602; G02F 1/133603; G02F 1/133611
    See application file for complete search history.

(56) References Cited

U.S. PATENT DOCUMENTS 6,873,099 B2 * 3/2005 Maeda .............. G02F 1/133603
                                                           313/502
8,110,839 B2 * 2/2012 Ing .................... G02F 1/133611
                                                            257/89

FOREIGN PATENT DOCUMENTS

| CN | 103968300 A | 8/2014 |
|----|-------------|--------|
| TW | I436507 B   | 5/2014 |
| TW | M558375 U   | 4/2018 |

* cited by examiner

*Primary Examiner* — Robert J May
(74) *Attorney, Agent, or Firm* — ScienBiziP, P.C.

(57) ABSTRACT

A backlight module includes a transparent substrate, a plurality of light sources on a surface of the transparent substrate, a reflective sheet on a side of the transparent substrate adjacent to the plurality of light sources, and at least one supporting member between the transparent substrate and the reflective sheet. The light sources are configured for emitting light. The reflective sheet is configured for reflecting light toward the transparent substrate. The at least one supporting member is configured for separating the plurality of light sources from the reflective sheet.

2 Claims, 4 Drawing Sheets

BACKLIGHT MODULE AND DISPLAY DEVICE HAVING TRANSPARENT SUBSTRATE WITH A PLURALITY OF LIGHT SOURCE DISPOSED THEREON

FIELD

The subject matter herein generally relates to a backlight module and a display device using the backlight module.

BACKGROUND

A conventional display device generally includes a direct backlight module to provide backlighting required for display. A direct backlight module generally includes a plurality of light sources for emitting light. The light sources are arranged in an array. However, a light brightness of one portion of the backlight module corresponding to the light source may be higher than that of other portions of the backlight module. Thus, light brightness of the backlight module is not uniform.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
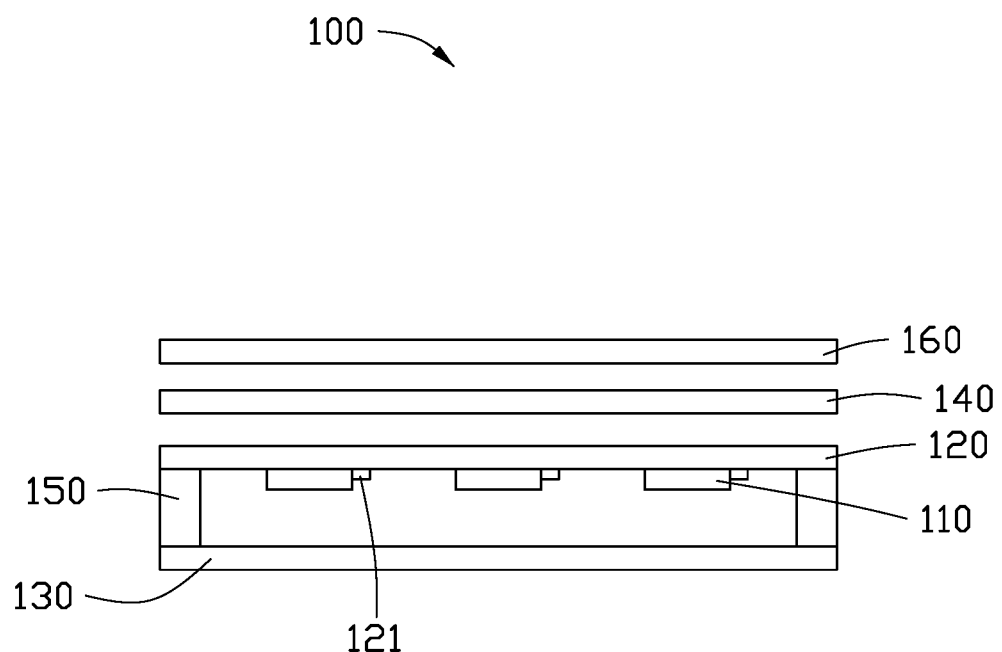
FIG. 1 is an isometric view of a backlight module according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

First Embodiment

FIG. 1 illustrates a backlight module 100 of a first embodiment. The backlight module 100 includes a plurality of light sources 110, a transparent substrate 120, a reflective sheet 130, a color conversion sheet 140, at least one supporting member 150, and an optical film 160.

The light sources 110 are spaced apart from each other and on a surface of the transparent substrate 120. The reflective sheet 130 faces the surface of the transparent substrate 120 on which the light sources 110 are located. The supporting member 150 is located between the reflective sheet 130 and the transparent substrate 120 such that the transparent substrate 120 is spaced apart from the reflective sheet 130. The color conversion sheet 140 is on a side of the transparent substrate 120 away from the light sources 110. The optical film 160 is on a side of the color conversion sheet 140 away from the transparent substrate 120. When the backlight module 100 is in operation, the light sources 110 emit light toward the reflective sheet 130, and light is reflected by the reflective sheet 130 back toward the transparent substrate 120. The reflected light passes through the transparent substrate 120, and enters into and through the color conversion sheet 140 and the optical film 160.

The transparent substrate 120 may be made of a transparent glass or a transparent plastic. The transparent plastic may be, for example, polyethylene terephthalate (PET), polyimide (PI) or the like. The transparent substrate 120 is provided with a conductive structure 121 for electrically coupling the light sources 110 to a power supply (not shown). In this embodiment, the light sources 110 are arranged in an array, and each of the light sources 110 has a size of 500 μm or less.

The conductive structure 121 may be plated on the surface of the transparent substrate 120. The conductive structure 121 may be made of a transparent conductive material, such as indium tin oxide (ITO); or the conductive structure 121 can be made of a metal, such as thin metal lines in a mesh arrangement. When the conductive structure 121 is metal mesh, a width of each metal line in the metal meshes may be about 3 μm.

The supporting member 150 is between the reflective sheet 130 and the transparent substrate 120 and maintains a distance between the transparent substrate 120 and the reflective sheet 130. In this embodiment, a number of the supporting members 150 is more than two, and the supporting member 150 is located to correspond to a peripheral portion of the transparent substrate 120. The supporting member 150 surrounds the light sources 110. In other embodiments, a plurality of supporting members 150 can be located between the light sources 110.

In this embodiment, the color conversion sheet 140 receives light passing through the transparent substrate 120, and converts a part of the light into different colors. The converted light and the unconverted light are combined into white light, and the combined white light emitted from the color conversion sheet 140 is diffused and/or brightened by the optical film 160. The optical film 160 may include at least one from a group consisting of a brightness enhancement sheet (such as a prism sheet), a holographic filter film, a brightness enhancement film, and a reflective diffusion sheet. In this embodiment, the backlight module 100 includes one optical film 160. In other embodiments, the backlight module 100 may include a plurality of optical films 160 on a side of the color conversion sheet 140 away from the transparent substrate 120. It will be appreciated that the color conversion sheet 140 includes a light converting material, such as a phosphor or quantum dots, configured for receiving and converting the light.

In one embodiment, the light source 110 includes a diode chip for emitting light. For example, the light may be blue light, and the color conversion sheet 140 may convert the blue light into yellow light. The color conversion sheet 140 includes a yellow-light converting material, such as yellow phosphor, or a mixture of red phosphor and green phosphor, or a mixture of red quantum dots and green quantum dots, or a mixture of red phosphor and green quantum dots, or a mixture of green phosphor and red quantum dots. The yellow-light converting material converts light to yellow light.

In one embodiment, the light source 110 includes two diode chips that emit light of two different colors, for example, one diode chip that emits blue light and one diode chip that emits green light. At this time, the light emitted by the light sources 110 is a mixed light of blue and green light. The color conversion sheet 140 may be a red conversion sheet converting light to a red color. The color conversion sheet 140 can includes a red-light converting material, such as red phosphor, red quantum dots, or a mixture of red quantum dots and red phosphor. The red-light converting material is configured for converting light to red light. It can be understood that, the light sources 110 include blue light emitting diode chips and green light emitting diode chips.

In one embodiment, the light source 110 includes two diode chips that emit light of two different colors, for example, one diode chip that emits blue light and one diode chip that emits red light. At this time, the light emitted by the light sources 110 is a mixed light of blue and red light. The color conversion sheet 140 may be a green color conversion sheet. The color conversion sheet 140 includes a green-light converting material, such as green phosphor, green quantum dot, or a mixture of green quantum dots and green phosphor. The green-light converting material is configured for converting light to green light. It can be understood that the light sources 110 include blue light emitting diode chips and red light emitting diode chips.

The light sources 110 are located on the transparent substrate 120 in the backlight module 100, and light from the light sources 110 is reflected back by the reflective sheet 130, to pass through the transparent substrate 120. Thus, light path of the light is elongated without increasing a thickness of the backlight module 100. Bright spots are much reduced, so light of the backlight module 100 can be uniform.

Second Embodiment

Figure 2:
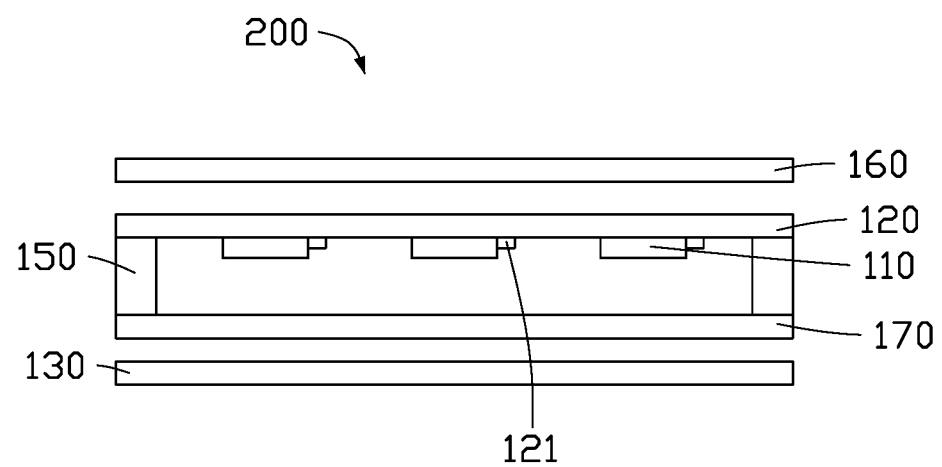
FIG. 2 is an isometric view of a backlight module according to a second embodiment of the present disclosure.

FIG. 2 illustrates a backlight module 200 of a second embodiment. The backlight module 200 is substantially the same as the backlight module 100 and also includes a plurality of light sources 110, a transparent substrate 120, a reflective sheet 130, at least one supporting member 150, and an optical film 160. The difference between the backlight module 200 and the backlight module 100 is that a color conversion sheet 170 of the backlight module 200 is located on a side of the reflective sheet 130 adjacent to the light sources 110; in the backlight module 100, the color conversion sheet 140 is located on a side of the transparent substrate 120 away from the light sources 110.

In this embodiment, the light sources 110 are located on the transparent substrate 120 and the reflective sheet 130 is located on a side of the light sources 110 away from the transparent substrate 120. The at least one supporting member 150 is located between the transparent substrate 120 and the color conversion sheet 170. The optical film 160 is located on a side of the transparent substrate 120 away from the light sources 110. The color conversion sheet 170 is located on a side of the reflective sheet 130 adjacent to the light sources 110 and converts a portion of light emitted from the light sources 110 to a different color.

When light is emitted from the light sources 110, a portion of the light is converted into converted light by the color conversion sheet 170, and a combination light of converted and unconverted light is incident on the reflective sheet 130 and is reflected by the reflective sheet 130. The combination light finally passes through the transparent substrate 120.

The light path of the light is again elongated without increasing a thickness of the backlight module 200, which is beneficial to diffusing light and avoids forming bright spots, so light of the backlight module 200 can be uniform.

Third Embodiment

Figure 3:
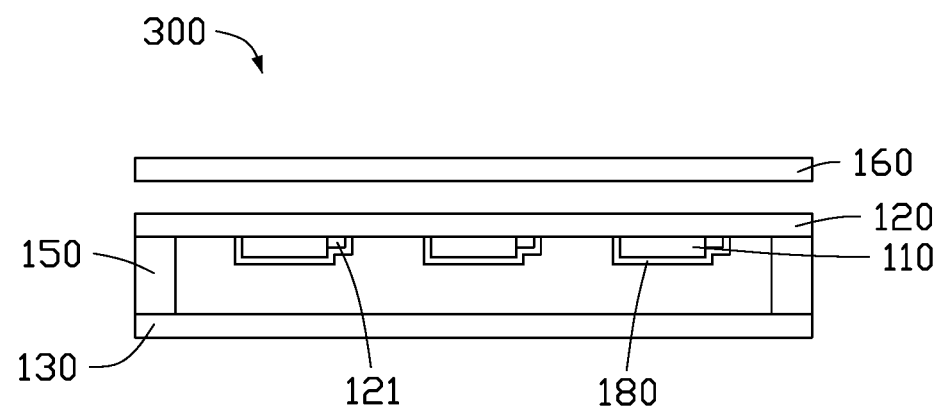
FIG. 3 is an isometric view of a backlight module according to a third embodiment of the present disclosure.

FIG. 3 illustrates a backlight module 300 of a third embodiment. The backlight module 300 is substantially the same as the backlight module 100 and also includes a plurality of light sources 110, a transparent substrate 120, a reflective sheet 130, at least one supporting member 150, and an optical film 160. The difference between the backlight module 300 and the backlight module 100 is that each light source 110 is coated with a color conversion film 180. In the case of the backlight module 100, the color conversion sheet 140 is located on a side of the transparent substrate 120 away from the light sources 110.

In the third embodiment, the light sources 110 are located on the transparent substrate 120 and the reflective sheet 130 is located on a side of the light sources 110 away from the transparent substrate 120. The at least one supporting member 150 is located between the transparent substrate 120 and the reflective sheet 130. The optical film 160 is located on a side of the transparent substrate 120 away from the light sources 110.

In this embodiment, the light source 110 may be a white light source, such as a white light emitting diode which may include a diode chip. The color conversion film 180 covers the light source 110. The diode chip emits the first color light and the color conversion film 180 includes a color conversion material for converting a portion of the first color light into a second color light. A combination of the second color light and the unconverted light may be white light. Such white light is directed toward the reflective sheet 130, reflected by the reflective sheet 130 toward the transparent substrate 120, and is finally emitted from transparent substrate 120.

In one embodiment, the first color light emitted from the diode chip is blue light, and the color conversion material contained in the color conversion layer 180 may be yellow phosphor, or a mixture of red phosphor and quantum dots, or a mixture of green phosphor and quantum dots.

The light path of the light is again elongated without increasing a thickness of the backlight module 300.

Figure 4:
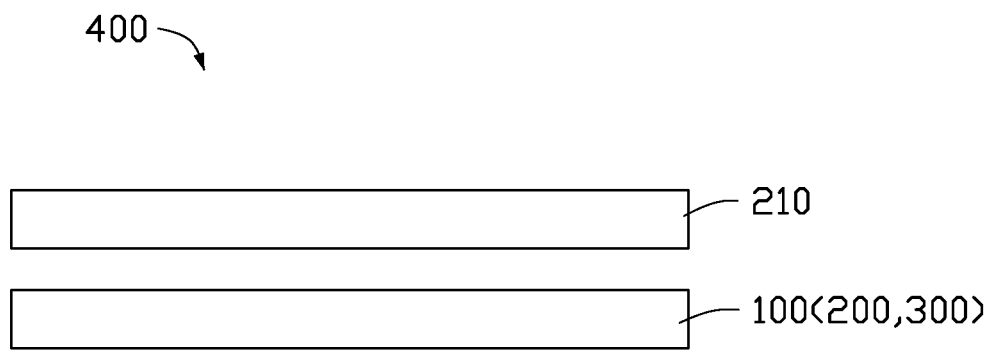
FIG. 4 is an isometric view of a display device according to an embodiment of the present disclosure.

FIG. 4 illustrates a display device 400. The display device 400 includes a backlight module 100 and a display panel 210 stacked on the backlight module 100. The display panel 210 can be a liquid crystal display panel, and the backlight module can be substituted by the backlight module 200 or the backlight module 300. The backlight module provides backlight for image display.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A backlight module, comprising:
    a transparent substrate;
    a plurality of light sources on a surface of the transparent substrate, the plurality of light sources being configured for emitting light;
    a reflective sheet on a side of the transparent substrate adjacent to the plurality of light sources, the reflective sheet being configured for reflecting light toward the transparent substrate; and
    at least one supporting member between the transparent substrate and the reflective sheet, the at least one supporting member being configured for separating the plurality of light sources from the reflective sheet;
    wherein the supporting member is located on a peripheral portion of the transparent substrate; the supporting member surrounds the plurality of light sources;
    wherein the backlight module further comprises a color conversion sheet on a side of the reflective sheet adjacent to the plurality of light sources.

2. A display device, comprising:
    a backlight module; and
    a display panel stacked on the backlight module;
    the backlight module, comprising:
    a transparent substrate;
    a plurality of light sources on a surface of the transparent substrate, the plurality of light sources being configured for emitting light;
    a reflective sheet on a side of the transparent substrate adjacent to the plurality of light sources, the reflective sheet being configured for reflecting light toward the transparent substrate; and
    at least one supporting member between the transparent substrate and the reflective sheet, the at least one supporting member being configured for separating the plurality of light sources from the reflective sheet;
    wherein the supporting member is located on a peripheral portion of the transparent substrate; the supporting member surrounds the plurality of light sources;
    wherein the backlight module further comprises a color conversion sheet on a side of the reflective sheet adjacent to the plurality of light sources.

* * * * *